(12) United States Patent
Chang

(10) Patent No.: US 10,621,011 B2
(45) Date of Patent: Apr. 14, 2020

(54) METHOD AND APPARATUS FOR CONTROLLING OPERATION RESOURCES, AND COMPUTER STORAGE MEDIUM

(71) Applicant: ONEPLUS TECHNOLOGY (SHENZHEN) CO., LTD., Shenzhen (CN)

(72) Inventor: Wenyen Chang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 49 days.

(21) Appl. No.: 15/747,482

(22) PCT Filed: Jun. 27, 2016

(86) PCT No.: PCT/CN2016/087227
§ 371 (c)(1),
(2) Date: Mar. 7, 2018

(87) PCT Pub. No.: WO2017/016359
PCT Pub. Date: Feb. 2, 2017

(65) Prior Publication Data
US 2018/0217877 A1  Aug. 2, 2018

(30) Foreign Application Priority Data
Jul. 28, 2015 (CN) .......................... 2015 1 0451706

(51) Int. Cl.
*G06F 9/48* (2006.01)
*G06F 9/50* (2006.01)
(Continued)

(52) U.S. Cl.
CPC ............ *G06F 9/5094* (2013.01); *G06F 1/206* (2013.01); *G06F 1/3206* (2013.01); *G06F 9/4893* (2013.01)

(58) Field of Classification Search
CPC ...... G06F 1/206; G06F 1/3206; G06F 1/3296; G06F 1/3234; G06F 9/30083
See application file for complete search history.

(56) References Cited

U.S. PATENT DOCUMENTS

7,502,948 B2   3/2009 Rotem
7,584,369 B2   9/2009 Capps
(Continued)

FOREIGN PATENT DOCUMENTS

CN   101111814 A   1/2008
CN   101114187 A   1/2008
(Continued)

OTHER PUBLICATIONS

Supplementary European Search Report in European application No. 16829725.7, dated Jun. 27, 2018.
(Continued)

*Primary Examiner* — Dong U Kim
(74) *Attorney, Agent, or Firm* — Syncoda LLC; Feng Ma

(57) ABSTRACT

Provided is a method for controlling operation resources. The method includes: acquiring a maximum frequency supporting running of first operation resources in an apparatus; determining a refrigerated plant quantity corresponding to the maximum frequency according to a pre-determined rule; and determining a second operation resource for a specific quantity, and closing the specific quantity of second operation resources, wherein the specific quantity is the same as the refrigerator quantity. Also provided are an apparatus for controlling operation resources and a computer storage medium.

20 Claims, 8 Drawing Sheets

(51) Int. Cl.
*G06F 1/20* (2006.01)
*G06F 1/3206* (2019.01)

(56) References Cited

U.S. PATENT DOCUMENTS

| | | | |
|---|---|---|---|
| 8,589,931 B2 * | 11/2013 | Barsness | G06F 1/3203 718/102 |
| 8,650,424 B2 | 2/2014 | Rotem | |
| 9,137,848 B2 | 9/2015 | Nho | |
| 2002/0062454 A1 * | 5/2002 | Fung | G06F 1/3203 713/300 |
| 2004/0117678 A1 * | 6/2004 | Soltis, Jr. | G06F 1/206 713/320 |
| 2006/0010353 A1 * | 1/2006 | Haugh | G06F 1/206 714/47.2 |
| 2006/0149975 A1 * | 7/2006 | Rotem | G06F 1/206 713/300 |
| 2007/0156370 A1 | 7/2007 | White | |
| 2008/0028244 A1 * | 1/2008 | Capps | G06F 1/206 713/324 |
| 2009/0172375 A1 | 7/2009 | Rotem | |
| 2011/0099397 A1 | 4/2011 | Rotem | |
| 2011/0154348 A1 * | 6/2011 | Elnozahy | G06F 1/324 718/104 |
| 2012/0179303 A1 | 7/2012 | Anderson | |
| 2013/0196709 A1 | 8/2013 | Nho | |
| 2013/0268257 A1 * | 10/2013 | Hu | G06F 17/5009 703/22 |
| 2014/0025967 A1 * | 1/2014 | Tran | G06F 1/3206 713/320 |
| 2014/0115362 A1 | 4/2014 | Rotem | |
| 2016/0018882 A1 | 1/2016 | Rotem | |
| 2016/0077840 A1 * | 3/2016 | Khatri | G06F 9/505 713/2 |
| 2016/0246359 A1 | 8/2016 | Rotem | |

FOREIGN PATENT DOCUMENTS

| | | |
|---|---|---|
| CN | 102841808 A | 12/2012 |
| CN | 103226462 A | 7/2013 |
| CN | 103677192 A | 3/2014 |
| CN | 104424156 A | 3/2015 |
| CN | 105068871 A | 11/2015 |

OTHER PUBLICATIONS

English Translation of International Search Report in international application No. PCT/CN2016/087227, dated Sep. 18, 2016.
English Translation of the Written Opinion of the International Search Authority in international application No. PCT/CN2016/087227, dated Sep. 18, 2016.

* cited by examiner

METHOD AND APPARATUS FOR CONTROLLING OPERATION RESOURCES, AND COMPUTER STORAGE MEDIUM

TECHNICAL FIELD

The disclosure relates to the technical field of electronics, and particularly to a computation resource control method and device and a computer storage medium.

BACKGROUND

Along with development of a technology, a calculation capability of a processor for an intelligent mobile terminal (for example, a mobile phone and a tablet computer) gets higher and higher. There are included more and more computation units in a tiny physical package of a processor, which attracts more and more attentions to a heat problem of the processor. In a conventional art, in case of high temperature in mobile terminal equipment, a thermal management may reduce frequencies of some computation units and even forcibly disable all computation units to achieve a purpose of reducing the temperature. If the temperature may still not be reduced, the thermal management, as a final barrier, may start device protection to forcibly implement device shutdown. Such a method may protect service life of a device from being shortened by the high temperature. However, a program in computation is easily interrupted forcibly, which brings influence to a user experience. There exists an improvement space for a thermal management strategy of an existing processor applied to an intelligent mobile terminal.

SUMMARY

Embodiments of the disclosure are expected to provide a computation resource control method and device and a computer storage medium, so as to solve the problem.

The embodiments of the disclosure provide a computation resource control method, which may include that: a highest frequency supported by a first computation resource for operation in a device is acquired; a cooling room number corresponding to the highest frequency is determined according to a predetermined rule; and a specific number of second computation resources are determined, and the specific number of second computation resources are disabled, herein the specific number may be the same as the cooling room number.

In one embodiment, the step that the cooling room number corresponding to the highest frequency is determined according to the predetermined rule may include that: a preset frequency point matched with the highest frequency is searched according to a preset cooling room demand table, and a cooling room number corresponding to the preset frequency point in the cooling room demand table is acquired, herein correspondences between preset frequency points and cooling room numbers may be recorded in the cooling room demand table.

In one embodiment, the step that the specific number of second computation resources are determined and the specific number of second computation resources are disabled may include that: idle computation resources, computation resources which are highly loaded and used for a long time and computation resources which are least busy are determined from among multiple second computation resources; and the computation resources are disabled according to one of the following manners: a specific number of idle computation resources are selected and disabled, all the idle computation resources and a part of computation resources which are highly loaded and used for a long time are disabled, a sum of numbers of the idle computation resources and the computation resources which are highly loaded and used for a long time being equal to the specific number, or all the idle computation resources, all the computation resources which are highly loaded and used for a long time and a part of computation resources which are least busy are disabled, a sum of numbers of the idle computation resources, the computation resources which are highly loaded and used for a long time and the computation resources which are least busy being equal to the specific number.

In one embodiment, after the step that the specific number of second computation resources are determined and the specific number of second computation resources are disabled, the method may further include that: a temperature of each computation resource is regularly acquired; and when it is detected that the temperature of a certain computation resource is higher than a preset value, the computation resource of which the temperature is higher than the preset value is disabled, and a task required to be processed by the disabled computation resource is transferred to the computation resource with the lowest temperature of the computation resources which have been disabled according to the cooling room number, so as to be processed by the transferred computation resource.

In one embodiment, after the step that the specific number of second computation resources are determined and the specific number of second computation resources are disabled, the method may further include that: a highest frequency supported by each computation resource for operation is determined, a minimum value is determined from among the determined highest frequencies, a cooling room number corresponding to the minimum value is determined according to the predetermined rule, and it is determined whether the determined cooling room number is smaller than the number of the computation resources which have been disabled at present; if the determined cooling room number is smaller than the number of the computation resources which have been disabled, it is further determined whether minimum current cost after a disabled computation resource is enabled is lower than present maximum current cost; and if the minimum current cost after a disabled computation resource is enabled is lower than present maximum current cost, the disabled computation resource is enabled.

The embodiments of the disclosure further provide a computation resource control method, which may include that: a temperature of each computation resource is regularly acquired; and when it is detected that a temperature of a specific computation resource is higher than a preset value, the computation resource of which the temperature is higher than the preset value is disabled, and processing required to be computed by the disabled computation resource is transferred to a computation resource with the lowest temperature in computation resources which have been disabled for processing.

The embodiments of the disclosure further provide a computation resource control device, which may include: an acquisition module arranged to acquire a highest frequency supported by a first computation resource for operation in a device; a determination module arranged to determine a cooling room number corresponding to the highest frequency according to a predetermined rule; and a disabling module arranged to determine a specific number of second computation resources, and disable the specific number of second computation resources, herein the specific number may be the same as the cooling room number.

In one embodiment, the determination module may further be arranged to search a preset frequency point matched with the highest frequency according to a preset cooling room demand table, and acquire a cooling room number corresponding to the preset frequency point in the cooling room demand table, herein correspondences between preset frequency points and cooling room numbers may be recorded in the cooling room demand table.

In one embodiment, the disabling module may include: a type determination module arranged to determine idle computation resources, computation resources which are highly loaded and used for a long time and computation resources which are least busy from among multiple second computation resources; and a resource disabling module arranged to disable the computation resources according to one of the following manners:

selecting and disabling a specific number of idle computation resources, disabling all the idle computation resources and a part of computation resources which are highly loaded and used for a long time, a sum of numbers of the idle computation resources and the computation resources which are highly loaded and used for a long time being equal to the specific number, or disabling all the idle computation resources, all the computation resources which are highly loaded and used for a long time and a part of computation resources which are least busy, a sum of numbers of the idle computation resources, the computation resources which are highly loaded and used for a long time and the computation resources which are least busy being equal to the specific number.

In one embodiment, the device may further include: a temperature acquisition module arranged to regularly acquire a temperature of each computation resource; and an exchange module arranged to, when it is detected that the temperature of a certain computation resource is higher than a preset value, disable the computation resource of which the temperature is higher than the preset value, and transfer a task required to be processed by the disabled computation resource to the computation resource with the lowest temperature of the computation resources which have been disabled according to the cooling room number, so as to be processed by the transferred computation resource.

In one embodiment, the device may further include: a first determination module arranged to determine a highest frequency supported by each computation resource for operation, determine a minimum value from among the determined highest frequencies, determine a cooling room number corresponding to the minimum value according to the predetermined rule, and determine whether the determined cooling room number is smaller than the number of the computation resources which have been disabled at present; a second determination module arranged to, if the determined cooling room number is smaller than the number of the computation resources which have been disabled, further determine whether minimum current cost after a disabled computation resource is enabled is lower than present maximum current cost; and a resource enabling module arranged to, if the minimum current cost after the disabled computation resource is enabled is lower than the present maximum current cost, enable the disabled computation resource.

The embodiments of the disclosure further provide a computation resource control device, which may include:

a temperature acquisition module arranged to regularly acquire a temperature of each computation resource; and an exchange module arranged to, when it is detected that a temperature of a certain computation resource is higher than a preset value, disable the computation resource of which the temperature is higher than the preset value, and transfer a task required to be processed by the disabled computation resource to a computation resource with the lowest temperature in computation resources which have been disabled, so as to be processed by the transferred computation resource.

The embodiments of the disclosure further provide a computer storage medium, in which a computer-executable instruction may be stored, the computer-executable instruction being arranged to execute the computation resource control method of the embodiments of the disclosure.

According to the computation resource control method and device and computer storage medium provided by the embodiments of the disclosure, the highest frequency presently operable for the first computation resource in the device is acquired, the cooling room number corresponding to the highest frequency is determined, the specific number of second computation resources are determined, and the specific number of second computation resources are disabled, herein the specific number is the same as the cooling room number. On the basis of the characteristic that heat may be autonomously transmitted from a high-temperature object to a low-temperature object, the second computation resources are disabled, the temperatures of the second computation resources are reduced, and then heat of the first computation resource with a relatively high temperature may be transmitted to the second computation resources with relatively low temperatures, thereby implementing heat dissipation of the first computation resource.

DETAILED DESCRIPTION

For making the purpose, technical solutions and advantages of the disclosure clearer, the disclosure will further be described below in combination with the drawings and embodiments in detail. It should be understood that the specific embodiments described here are adopted not to limit the disclosure but only to explain the disclosure.

Figure 1:
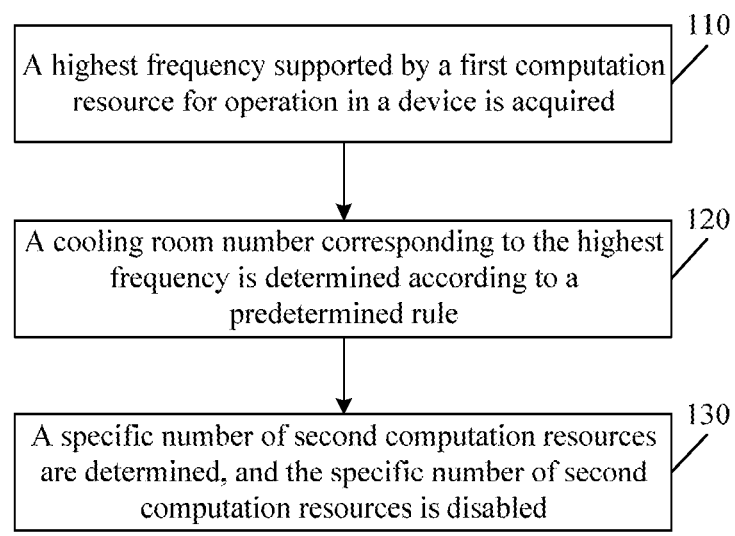
FIG. 1 is a flowchart of a computation resource control method according to an embodiment.

As shown in FIG. 1, in an embodiment, a computation resource control method is disclosed. The method may be applied to multiple electronic devices, including, but not limited to, a personal computer, a notebook computer, a smart phone, a tablet computer and intelligent wearable equipment. The method specifically includes the following steps.

In Step 110, a highest frequency supported by a first computation resource for operation in a device is acquired.

The computation resource may be a core of a Central Processing Unit (CPU) in a processor. For example, a CPU of an existing typical processor for a mobile terminal may have 4, 6 or 8 cores. The computation resource may further be a Graphics Processing Unit (GPU) in the processor. It can be understood that those skilled in the art may realize that the computation resource is not limited to the above two, and in another implementation mode, the computation resource may be a component with a calculation capability in a processor, such as a core, a master core, a sub-core and a hardware engine. The computation resource may be a single one or combination of the abovementioned types.

In the embodiment, the computation resource in the device usually supports multi-frequency-point computation, and usually selects a proper frequency point in all optional frequency points as an operating frequency according to a computation load and a utilization rate. The highest frequency refers to a maximum frequency in all the optional frequency points. For protecting the processor from being damaged by overheat, a thermal management may forcibly reduce the optional frequency points of the computation resource and accordingly reduce the highest frequency when detecting a high temperature.

For example, there are 10 frequency points available for a certain computation resource at the beginning: 634 MHz, 768 MHz, 864 MHz, 960 MHz, 1,248 MHz, 1,344 MHz, 1,440 MHz, 1,536 MHz, 1,632 MHz and 1,766 MHz, and at this moment, a highest frequency is 1,766 MHz. When a temperature of the computation resource is relatively high, the available frequency points are reduced step by step. For example, the available frequency points are reduced to 9 at first, and at this moment, the highest frequency is 1,632 MHz. If the temperature is kept increased, the available frequency points are reduced to 8 only, and at this moment, the highest frequency is reduced to 1,536 MHz, and so on.

In Step 120, a cooling room number corresponding to the highest frequency is determined according to a predetermined rule.

In the embodiment, a cooling room demand table is preset and stored in the device, and correspondences between preset frequency points and cooling room numbers are recorded in the cooling room demand table. Specifically, a preset frequency point matched with the highest frequency is searched in the cooling room demand table, and then a cooling room number is determined according to the preset frequency point. In the embodiment, the frequency points recorded in the cooling room demand table are frequency critical points corresponding to different cooling room numbers, and when the highest frequency is between two frequency critical points, the frequency point matched with the highest frequency is the relatively large frequency point. In another implementation mode, the cooling room number may be calculated on the basis of highest frequency of the computation resource through a specific formula.

For example, in a specific example, a certain processor has four available computation resources, and frequency points 384 MHz, 480 MHz, 768 MHz, 864 MHz, 960 MHz, 1,248 MHz, 1,344 MHz, 1,632 MHz and 1,766 MHz are provided. The preset cooling room demand table may be shown in Table 1.

TABLE 1

1. 768 MHz
2. 1,248 MHz
3. 1,766 MHz
4. Cooling room number = 2
5. Cooling room number = 1
6. Cooling room number = 0

Herein, when 768 MHz<highest frequency<1,248 MHz, the highest frequency is lower than 1,248 MHz, but has yet not been reduced to 768 MHz, then the frequency point matched with the present highest frequency is 1,248 MHz, and the corresponding cooling room number is 1. When 1,248 MHz<highest frequency<1,766 MHz, the frequency point matched with the present highest frequency is 1,766 MHz. When highest frequency<768 MHz, the frequency point matched with the present highest frequency is 768 MHz.

In Step 130, a specific number of second computation resources are determined, and the specific number of second computation resources are disabled, herein the specific number is the same as the cooling room number.

When a workload of the first computation resource is relatively high but the present highest operable frequency is relatively low, it is indicated that a temperature of the first computation resource is relatively high and thus its highest operable frequency is reduced, and at this moment, heat dissipation is required. In the embodiment, the second computation resources are disabled for heat dissipation. Specifically, the second computation resources are disabled, that is, the second computation resources are deenergized, and temperatures of the second computation resources are reduced. When the temperatures of the second computation resources are lower than the first computation resource, considering directivity of heat conduction, that is, heat may be autonomously transmitted from a high-temperature object to a low-temperature object, heat of the first computation resource with the relatively high temperature may be transmitted to the second computation resources with the relatively low temperatures, thereby implementing heat dissipation of the first computation resource. Thus, the disabled second computation resources are called as cooling rooms.

In the implementation mode, the second computation resources and the first computation resource are of the same type, and are all cores of the CPU in the processor. It can be understood that, in another implementation mode, the second computation resources and the first computation resource may be of different types when necessary, for example, the first computation resource is a core of the CPU in the processor, and the second computation resources may be one type of components or combinations of multiple types in components with a calculation capability such as the GPU and hardware engine in the processor.

The specific number of second computation resources are not randomly selected from multiple second computation resources, and one of multiple factors required to be considered is a physical layout of the second computation resources, that is, the second computation resources close to the first computation resource are selected.

Figure 2:
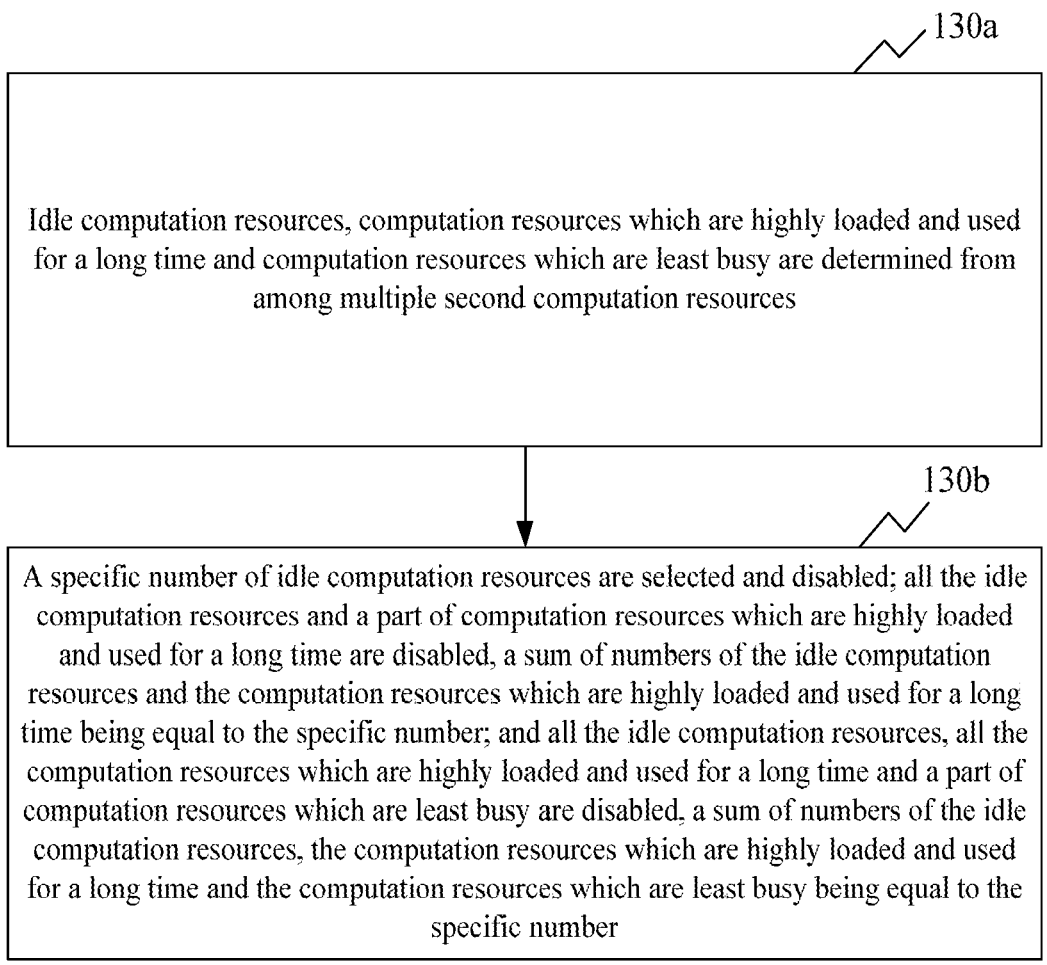
FIG. 2 is a flowchart of disabling a computation resource according to an embodiment.

As shown in FIG. 2, in an embodiment, the step that the specific number of second computation resources are determined and the specific number of second computation resources are disabled includes the following steps.

In Step 130a, idle computation resources, computation resources which are highly loaded and used for a long time and computation resources which are least busy are determined from among multiple second computation resources.

In the embodiment, the computation resources are divided into three types in advance, i.e. the idle computation resources, the computation resources which are highly loaded and used for a long time and the computation resources which are least busy respectively, herein the idle computation resources refer to computation resources which have no computation tasks and are in an idle state, the computation resources which are highly loaded and used for a long time refer to computation resources which are kept in a busy state within a certain period of time, and the computation resources which are least busy refer to computation resources with lowest operating loads.

In Step 130b, the computation resources are disabled according to one of the following manners:

a specific number of idle computation resources are selected and disabled, all the idle computation resources and a part of computation resources which are highly loaded and used for a long time are disabled, a sum of numbers of the idle computation resources and the computation resources which are highly loaded and used for a long time being equal to the specific number, or all the idle computation resources, all the computation resources which are highly loaded and used for a long time and a part of computation resources which are least busy are disabled, a sum of numbers of the idle computation resources, the computation resources which are highly loaded and used for a long time and the computation resources which are least busy being equal to the specific number.

In the embodiment, computation resources in a number equal to the cooling room number are disabled according to the cooling room number. Specifically, if the number meets a requirement, the idle computation resources are preferably selected to be disabled. When the number of the idle computation resources is smaller than the cooling room number, all the idle computation resources are disabled, and a part of computation resources which are highly loaded and used for a long time are selected to be disabled. When a number of all the idle computation resources and all the computation resources which are highly loaded and used for a long time is smaller than the cooling room number, all of them are disabled, and then a part of computation resources which are least busy are selected to be disabled.

For example, if the required cooling room number searched from the cooling room demand table is 4, 4 computation resources are required to be disabled, and the idle computation resources are preferably disabled. If there is only one idle computation resource at present, the other 3 select computation resources which are highly loaded and used for a long time to be disabled. If the number of the computation resources which are highly loaded and used for a long time is smaller than 3, the left selects computation resources which are least busy to be disabled.

In the embodiment, the idle computation resources are preferably disabled. This is because they have no computation tasks, but clock sources and power supplies arranged to them have yet not been completely cut off and just enter a relatively low-current mode, only after they are disabled, supplied power may be completely cut off, there is no possibility of converting electricity into heat, and heat dissipation may be helped most preferably. Therefore, it is most appropriate to preferably disable the idle computation resources. If there are insufficient idle computation resources, the computation resources which are highly loaded and used for a long time are selected to be disabled. This is because the temperatures may be relatively high after high loads are kept for a period of time, more heat may be produced by electricity if the temperatures are higher, and is usually exponentially increased, then power supplies are required to supply increasingly high currents to cancel waste caused by conversion of the electricity into heat at the high temperatures, more heat may be produced if the currents are higher, and then more and more heat is accumulated, which is unfavorable for heat dissipation. In order to avoid such a condition, the computation resources which are highly loaded and used for a long time are disabled as second preferred objects. If the number of the two may still not meet the requirement, the computation resources which are least busy are selected to be disabled. Their temperatures are in an intermediate and balanced state, and there is no urgent disabling need, so that they are selected last. By a reasonable sequence of selecting the computation resources to be disabled, heat dissipation may be implemented more effectively.

In an embodiment, for more comprehensive and uniform heat dissipation of the device, cooling rooms may further be alternated. After Step 130 that the specific number of second computation resources are determined and the specific number of second computation resources are disabled, the method further includes the following steps.

A temperature of each computation resource is regularly acquired.

In the embodiment, a thermal sensor is arranged in the vicinity of each computation resource, and the temperature of each computation resource may be rapidly detected. For timely knowing about a change condition of the temperature of each computation resource, data of the thermal sensor may be regularly (for example, 1 second) acquired to determine the temperature of each computation resource.

When it is detected that the temperature of a certain computation resource is higher than a preset value, the computation resource of which the temperature is higher than the preset value is disabled, and a task required to be processed by the disabled computation resource is transferred to the computation resource with the lowest temperature of the computation resources which have been disabled, so as to be processed by the transferred computation resource.

The computation resources in the step all belong to the same type, and for example, are all cores in the CPU of the processor.

In the embodiment, a preset value is preset for the temperature of each computation resource, and after the computation resources are disabled according to the cooling room number, if it is found that the temperatures of the computation resources are still relatively high but not high enough to disable a computation resource, when it is detected that the temperature of a certain computation resource is higher than the preset value, the computation resource is disabled, and meanwhile, a task required to be computed by the disabled computation resource is transferred to the computation resource with the lowest temperature of the computation resources which have been disabled at present for processing. In such a manner, the computation resource of which the temperature is high is disabled, and meanwhile, the disabled computation resource with the lowest temperature is enabled, so that more comprehensive and uniform heat dissipation may be implemented.

Figure 3:
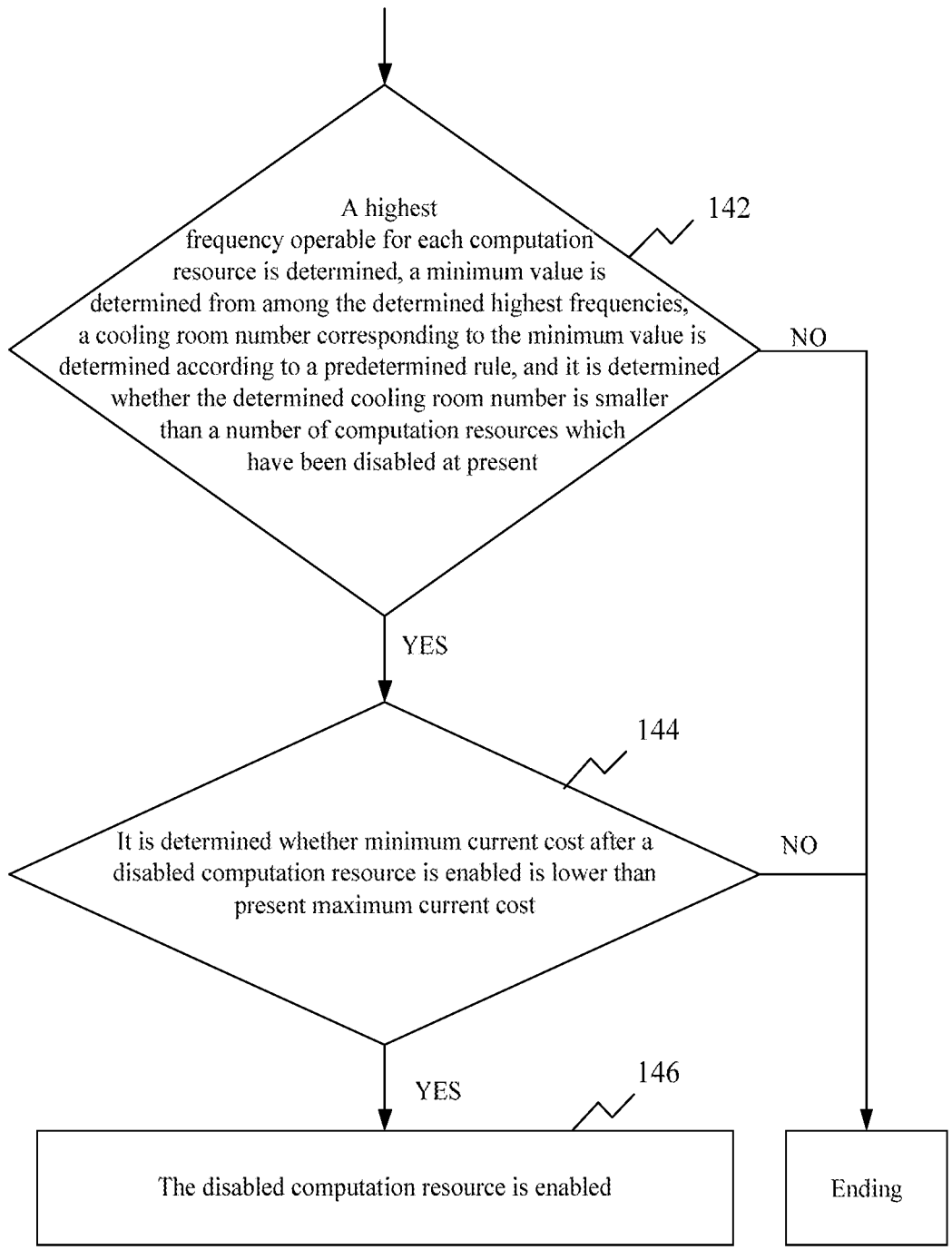
FIG. 3 is a flowchart of enabling a computation resource which has been disabled according to an embodiment.

In an embodiment, for reasonably utilizing the computation resources, the disabled computation resources may be re-enabled and recovered into computation resources with a collaborative computation capability. As shown in FIG. 3, after the step that the specific number of second computation resources are determined and the specific number of second computation resources are disabled, the method further includes the following steps.

In Step 142, a highest frequency operable for each computation resource is determined, a minimum value is determined from among the determined highest frequencies, a cooling room number corresponding to the minimum value is determined according to the predetermined rule, it is determined whether the determined cooling room number is smaller than the number of the computation resources which have been disabled at present, Step 144 is entered if YES, otherwise the method is ended. It is important to note that, in an implementation mode, if presently operating computation resources share the same clock source, the present operating computation resources have the same highest operable frequency, and the minimum value is the highest frequency operable for the presently operating computation resources.

In the embodiment, after the specific number of second computation resources are disabled, the highest frequency operable for each computation resource is determined again, the minimum value is determined in the highest frequencies of all the computation resources, a preset frequency point matched with the minimum value in the cooling room demand table is searched according to the preset cooling room demand table, and a corresponding cooling room number in the cooling room demand table is searched according to the preset frequency point. The frequency points recorded in the cooling room demand table are the frequency critical points corresponding to different cooling room numbers, and when the minimum value is between two frequency critical points, the frequency point matched with the minimum value is the relatively small frequency point.

Specifically, as shown in Table 1, when 768 MHz<minimum value<1,248 MHz, the minimum value is larger than 768 MHz but smaller than 1,248 MHz, then the frequency point matched with the minimum value is 768 MHz, and the corresponding cooling room number is 2. When 1,248 MHz<minimum value<1,766 MHz, the frequency point matched with the present minimum value is 1,248 MHz, and the corresponding cooling room number is 1. When minimum value>1,766 MHz, the frequency point matched with the present minimum value is 1,766 MHz, and the corresponding cooling room number is 0. For example, the present cooling room number is 2, a cooling room is allowed to be released (that is, a disabled computation resource is enabled) only when the minimum value returns to over 1,248 MHz, and 1,248 MHz is a minimum frequency point required to be reached after a cooling room is released.

In Step 144, it is determined whether minimum current cost after a disabled computation resource is enabled is lower than present maximum current cost, Step 306 is entered if YES, otherwise the method is ended.

Specifically, current cost is power consumption, and its calculation formula is Power(f)*M, where f represents a frequency, Power(f) represents power consumption under the frequency f, and M represents a number of presently operating computation resources. Minimum current cost refers to current cost when the frequency is at a minimum frequency point, and the minimum current cost after the disabled computation resource is enabled may be represented as Power($f_{min}$)*(M+1), where $f_{min}$ represents a minimum frequency point required to be reached by a highest frequency operable for a disabled computation resource, the minimum frequency point is searched from the cooling room demand table, and since the disabled computation resource is enabled, the presently operating computation resources are increased to M+1. The present maximum current cost is represented as Power(F)*M, and represents current cost in execution of the computation resources under the present highest frequency F under the condition that the cooling room number M is kept unchanged, herein F represents a presently allowable highest frequency. Determining whether the minimum current cost after the disabled computation resource is enabled is lower than the present maximum current cost is to determine whether present maximum power consumption is enough to bear power consumption after a cooling room is released, Step 146 is entered if YES, and if NO, the method is ended.

In Step 146, the disabled computation resource is enabled.

In the embodiment, if the present cooling room number is larger than the required cooling room number and the minimum current cost after the disabled computation resource is enabled is lower than the present maximum current cost, a cooling room is released, that is, the disabled computation resource is enabled. In such a manner, the computation resources may be fully and reasonably utilized without computation resource waste.

The embodiment of the disclosure further provides a computer storage medium, in which a computer-executable instruction is stored, the computer-executable instruction being arranged to execute the computation resource control method of the embodiment of the disclosure.

Figure 4:
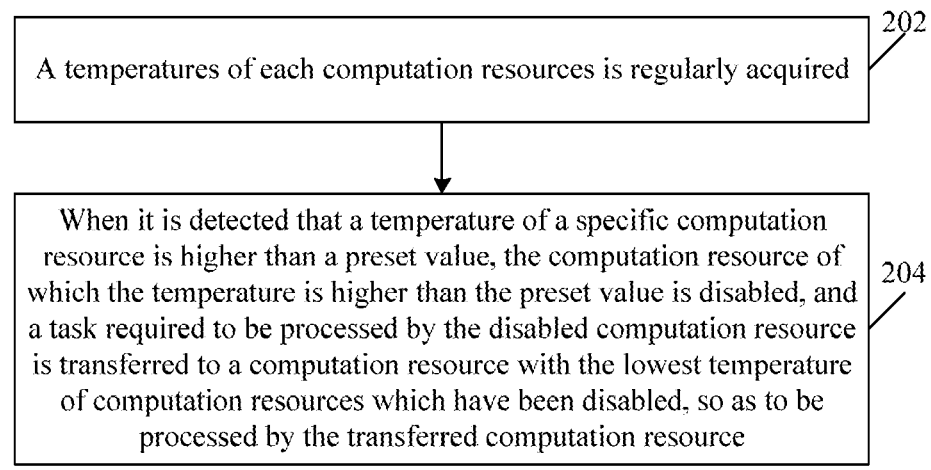
FIG. 4 is a flowchart of another computation resource control method according to an embodiment.

As shown in FIG. 4, in an embodiment, a computation resource control method is disclosed. The method includes the following steps.

In Step 202, a temperature of each computation resource is regularly acquired.

In the embodiment, a thermal sensor is arranged in the vicinity of each computation resource, and the temperature of each computation resource may be rapidly detected. For timely knowing about a change condition of the temperature of each computation resource, data of the thermal sensor may be regularly (for example, 1 second) acquired to determine the temperature of each computation resource.

In Step 204, when it is detected that a temperature of a specific computation resource is higher than a preset value, the computation resource of which the temperature is higher than the preset value is disabled, and a task required to be processed by the disabled computation resource is transferred to a computation resource with the lowest temperature in computation resources which have been disabled, so as to be processed by the transferred computation resource.

The computation resources in Steps 202 and 204 all belong to the same type, and for example, are all cores in a CPU of a processor.

In the embodiment, a preset value is preset for the temperature of each computation resource, and after the computation resources are disabled according to a cooling room number, if it is found that the temperatures of the computation resources are still relatively high but not high enough to disable a computation resource, when it is detected that the temperature of a certain computation resource is higher than the preset value, the computation resource is disabled, and meanwhile, a task required to be computed by the disabled computation resource is transferred to the computation resource with the lowest temperature of the computation resources which have been disabled at present for processing. In such a manner, the computation resource of which the temperature is high is disabled, and meanwhile, the disabled computation resource with the lowest temperature is enabled, so that more comprehensive and uniform heat dissipation may be implemented.

In an implementation mode, Steps 202 and 204 are set after Step 130.

The embodiment of the disclosure further provides a computer storage medium, in which a computer-executable instruction is stored, the computer-executable instruction being arranged to execute the computation resource control method of the embodiment of the disclosure.

Figure 5:
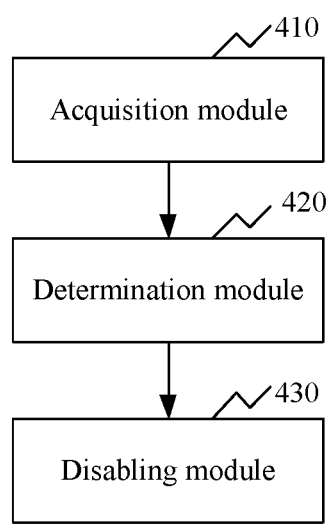
FIG. 5 is a structure block diagram of a computation resource control device according to an embodiment.

As shown in FIG. 5, in an embodiment, a computation resource control device is disclosed. The device includes:

an acquisition module 410 arranged to acquire a highest frequency supported by a first computation resource for operation in a device;

a determination module 420 arranged to determine a cooling room number corresponding to the highest frequency according to a predetermined rule; and a disabling module 430 arranged to determine a specific number of second computation resources, and disable the specific number of second computation resources, herein the specific number is the same as the cooling room number.

In an embodiment, the determination module 420 is further arranged to search a preset frequency point matched with the highest frequency according to a preset cooling room demand table, and acquire a cooling room number corresponding to the preset frequency point in the cooling room demand table, herein correspondences between preset frequency points and cooling room numbers are recorded in the cooling room demand table.

Figure 6:
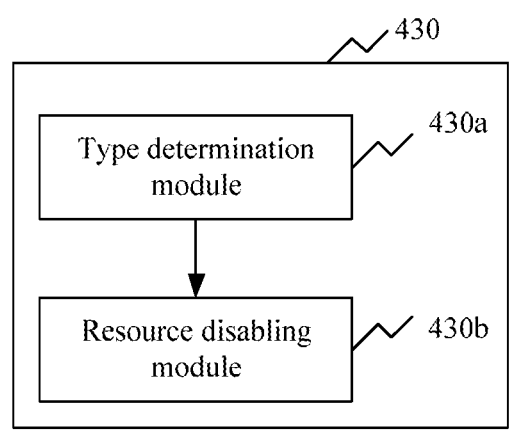
FIG. 6 is a structure block diagram of a disabling module according to an embodiment.

As shown in FIG. 6, in an embodiment, the disabling module 430 includes:

a type determination module 430*a* arranged to determine idle computation resources, computation resources which are highly loaded and used for a long time and computation resources which are least busy from among multiple second computation resources; and a resource disabling module 430*b* arranged to disable the computation resources according to one of the following manners:

selecting and disabling a specific number of idle computation resources, disabling all the idle computation resources and a part of computation resources which are highly loaded and used for a long time, a sum of numbers of the idle computation resources and the computation resources which are highly loaded and used for a long time being equal to the specific number, or disabling all the idle computation resources, all the computation resources which are highly loaded and used for a long time and a part of computation resources which are least busy, a sum of numbers of the idle computation resources, the computation resources which are highly loaded and used for a long time and the computation resources which are least busy being equal to the specific number.

In an embodiment, the device further includes:

a temperature acquisition module arranged to regularly acquire a temperature of each computation resource; and an exchange module arranged to, when it is detected that the temperature of a certain computation resource is higher than a preset value, disable the computation resource of which the temperature is higher than the preset value, and transfer a task required to be processed by the disabled computation resource to the computation resource with the lowest temperature of the computation resources which have been disabled according to the cooling room number, so as to be processed by the transferred computation resource.

Figure 7:
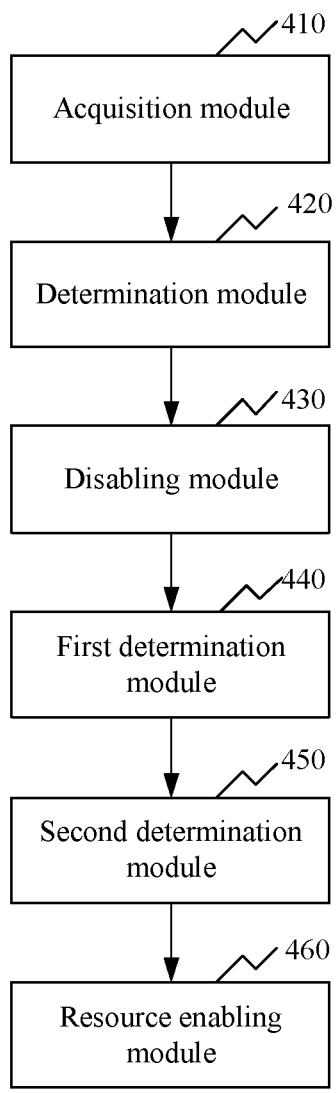
FIG. 7 is a structure block diagram of a computation resource control device according to another embodiment.

As shown in FIG. 7, in an embodiment, the device further includes:

a first determination module 440 arranged to determine a highest frequency supported by each computation resource for operation, determine a minimum value from among the determined highest frequencies, determine a cooling room number corresponding to the minimum value according to the predetermined rule, and determine whether the determined cooling room number is smaller than the number of the computation resources which have been disabled at present;

a second determination module 450 arranged to, if the determined cooling room number is smaller than the number of the computation resources which have been disabled, further determine whether minimum current cost after a disabled computation resource is enabled is lower than present maximum current cost; and a resource enabling module 460 arranged to, if the minimum current cost after the disabled computation resource is enabled is lower than the present maximum current cost, enable the disabled computation resource.

In the embodiment of the disclosure, the computation resource control device may be implemented by a personal computer during a practical application. The acquisition module 410, determination module 420 and disabling module 430 in the computation resource control device and submodules of the disabling module 430, including the type determination module 430*a* and the resource disabling module 430*b*, may all be implemented by a CPU, Digital Signal Processor (DSP), Microcontroller Unit (MCU) or Field-Programmable Gate Array (FPGA) in the computation resource control device during the practical application.

Figure 8:
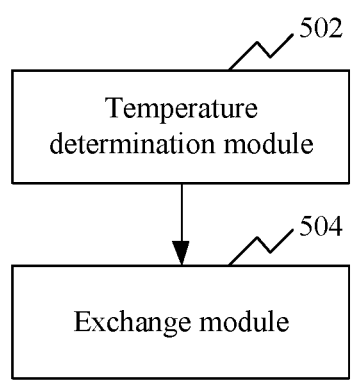
FIG. 8 is a structure block diagram of another computation resource control device according to an embodiment.

As shown in FIG. 8, in an embodiment, a computation resource control device is disclosed. The device includes:

a temperature acquisition module 502 arranged to regularly acquire a temperature of each computation resource; and an exchange module 504 arranged to, when it is detected that a temperature of a certain computation resource is higher than a preset value, disable the computation resource of which the temperature is higher than the preset value, and transfer a task required to be processed by the disabled computation resource to a computation resource with the lowest temperature in computation resources which have been disabled, so as to be processed by the transferred computation resource.

In the embodiment of the disclosure, the computation resource control device may be implemented by a personal computer during a practical application. The temperature acquisition module 502 and exchange module 504 in the computation resource control device may both be implemented by a CPU, DSP, MCU or FPGA in the computation resource control device during the practical application.

In some embodiments provided by the application, it should be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected executed. In addition, coupling, or direct coupling or communication connection between each displayed or discussed component may be indirect coupling or communication connection, implemented through some interfaces, of the equipment or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit. The integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as mobile storage equipment, a Read-Only Memory (ROM), a Random Access Memory (RAM), a magnetic disk or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions arranged to enable a piece of computer equipment (which may be a personal computer, a server, network equipment or the like) to execute all or part of the method in each embodiment of the disclosure. The abovementioned storage medium includes: various media capable of storing program codes such as mobile storage equipment, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

According to the technical solutions of the embodiments of the disclosure, the highest frequency presently operable for the first computation resource in the device is acquired, the cooling room number corresponding to the highest frequency is determined, the specific number of second computation resources are determined, and the specific number of second computation resources are disabled, herein the specific number is the same as the cooling room number. On the basis of the characteristic that heat may be autonomously transmitted from a high-temperature object to a low-temperature object, the second computation resources are disabled, the temperatures of the second computation resources are reduced, and then heat of the first computation resource with a relatively high temperature may be transmitted to the second computation resources with relatively low temperatures, thereby implementing heat dissipation of the first computation resource.

The invention claimed is:

1. A computation resource control method, comprising:
acquiring a highest frequency supported by a first computation resource for operation in a device;
determining a cooling room number corresponding to the highest frequency according to a predetermined rule; and
determining a specific number of second computation resources, and disabling the specific number of second computation resources, wherein the specific number is the same as the cooling room number,
wherein determining the specific number of second computation resources and disabling the specific number of second computation resources comprises:
determining idle computation resources, computation resources which are highly loaded and used for a long time and computation resources which are least busy from among a plurality of second computation resources, wherein the computation resources which are highly loaded and used for a long time refer to computation resources which are kept in a busy state within a certain period of time; and
disabling the computation resources according to one of the following manners:
selecting and disabling the specific number of idle computation resources,
disabling all the idle computation resources and a part of computation resources which are highly loaded and used for a long time, wherein a sum of a number of the idle computation resources and a number of disabled computation resources which are highly loaded and used for a long time is equal to the specific number, or
disabling all the idle computation resources, all the computation resources which are highly loaded and used for a long time and a part of computation resources which are least busy, wherein a sum of a number of the idle computation resources, a number of the computation resources which are highly loaded and used for a long time and a number of disabled computation resources which are least busy is equal to the specific number;
wherein selecting the computation resources to be disabled according to the following sequence:
the idle computation resources are disabled as first preferred objects;
the computation resources which are highly loaded and used for a long time are disabled as second preferred objects; and
the computation resources which are least busy are disabled as last preferred objects.

2. The method according to claim 1, wherein determining the cooling room number corresponding to the highest frequency according to the predetermined rule comprises:
searching a preset frequency point matched with the highest frequency according to a preset cooling room demand table, and acquiring a cooling room number corresponding to the preset frequency point in the cooling room demand table, wherein correspondences between preset frequency points and cooling room numbers are recorded in the cooling room demand table.

3. The method according to claim 1, further comprising:
after determining the specific number of second computation resources and disabling the specific number of second computation resources,
regularly acquiring a temperature of each computation resource; and
when it is detected that the temperature of a certain computation resource is higher than a preset value, disabling the computation resource of which the temperature is higher than the preset value, and transferring a task required to be processed by the disabled computation resource to a computation resource with the lowest temperature of the computation resources which have been disabled according to the cooling room number, so as to be processed by the transferred computation resource.

4. The method according to claim 1, further comprising:
after determining the specific number of second computation resources and disabling the specific number of second computation resources,
determining a highest frequency supported by each computation resource for operation, determining a minimum value from among the determined highest frequencies, determining a cooling room number corresponding to the minimum value according to the predetermined rule, and determining whether the determined cooling room number is smaller than the number of the computation resources which have been disabled;
if the determined cooling room number is smaller than the number of the computation resources which have been disabled, further determining whether minimum current cost after a disabled computation resource is enabled is lower than present maximum current cost; and if the minimum current cost after a disabled computation resource is enabled is lower than present maximum current cost, enabling the disabled computation resource.

5. A computation resource control device, comprising:
a processor; and
a memory for storing instructions executable by the processor,
wherein the processor is arranged to:
acquire a highest frequency supported by a first computation resource for operation in a device;
determine a cooling room number corresponding to the highest frequency according to a predetermined rule; and
determine a specific number of second computation resources, and disable the specific number of second computation resources, wherein the specific number is the same as the cooling room number,
wherein determining the specific number of second computation resources and disabling the specific number of second computation resources comprises:
determining idle computation resources, computation resources which are highly loaded and used for a long time and computation resources which are least busy from among a plurality of second computation resources, wherein the computation resources which are highly loaded and used for a long time refer to computation resources which are kept in a busy state within a certain period of time; and
disabling the computation resources according to one of the following manners:
selecting and disabling the specific number of idle computation resources,
disabling all the idle computation resources and a part of computation resources which are highly loaded and used for a long time, wherein a sum of a number of the idle computation resources and a number of disabled computation resources which are highly loaded and used for a long time is equal to the specific number, or
disabling all the idle computation resources, all the computation resources which are highly loaded and used for a long time and a part of computation resources which are least busy, wherein a sum of a number of the idle computation resources, a number of the computation resources which are highly loaded and used for a long time and a number of disabled computation resources which are least busy is equal to the specific number;
wherein selecting the computation resources to be disabled according to the following sequence:
the idle computation resources are disabled as first preferred objects;
the computation resources which are highly loaded and used for a long time are disabled as second preferred objects; and
the computation resources which are least busy are disabled as last preferred objects.

6. The device according to claim 5, wherein determining the cooling room number corresponding to the highest frequency according to the predetermined rule comprises:
searching a preset frequency point matched with the highest frequency according to a preset cooling room demand table, and acquiring a cooling room number corresponding to the preset frequency point in the cooling room demand table, wherein correspondences between preset frequency points and cooling room numbers are recorded in the cooling room demand table.

7. The device according to claim 5, wherein the processor is further arranged to: after determining the specific number of second computation resources and disabling the specific number of second computation resources,
regularly acquire a temperature of each computation resource; and
when it is detected that the temperature of a certain computation resource is higher than a preset value, disable the computation resource of which the temperature is higher than the preset value, and transfer a task required to be processed by the disabled computation resource to the computation resource with the lowest temperature of the computation resources which have been disabled according to the cooling room number, so as to be processed by the transferred computation resource.

8. The device according to claim 5, wherein the processor is further arranged to: after determining the specific number of second computation resources and disabling the specific number of second computation resources,
determine a highest frequency supported by each computation resource for operation, determine a minimum value from among the determined highest frequencies, determine a cooling room number corresponding to the minimum value according to the predetermined rule, and determine whether the determined cooling room number is smaller than the number of the computation resources which have been disabled at present;
if the determined cooling room number is smaller than the number of the computation resources which have been disabled, further determine whether minimum current cost after a disabled computation resource is enabled is lower than present maximum current cost; and if the minimum current cost after the disabled computation resource is enabled is lower than the present maximum current cost, enable the disabled computation resource.

9. A non-transitory computer storage medium having stored thereon computer-executable instructions arranged to execute a computation resource control method, the method comprising:
- acquiring a highest frequency supported by a first computation resource for operation in a device;
- determining a cooling room number corresponding to the highest frequency according to a predetermined rule; and
- determining a specific number of second computation resources, and disabling the specific number of second computation resources, wherein the specific number is the same as the cooling room number,
- wherein determining the specific number of second computation resources and disabling the specific number of second computation resources comprises:
- determining idle computation resources, computation resources which are highly loaded and used for a long time and computation resources which are least busy from among a plurality of second computation resources, wherein the computation resources which are highly loaded and used for a long time refer to computation resources which are kept in a busy state within a certain period of time; and
- disabling the computation resources according to one of the following manners:
- selecting and disabling the specific number of idle computation resources,
- disabling all the idle computation resources and a part of computation resources which are highly loaded and used for a long time, wherein a sum of a number of the idle computation resources and a number of disabled computation resources which are highly loaded and used for a long time is equal to the specific number, or
- disabling all the idle computation resources, all the computation resources which are highly loaded and used for a long time and a part of computation resources which are least busy, wherein a sum of a number of the idle computation resources, a number of the computation resources which are highly loaded and used for a long time and a number of disabled computation resources which are least busy is equal to the specific number;
- wherein selecting the computation resources to be disabled according to the following sequence:
- the idle computation resources are disabled as first preferred objects;
- the computation resources which are highly loaded and used for a long time are disabled as second preferred objects; and
- the computation resources which are least busy are disabled as last preferred objects.

10. The non-transitory computer storage medium according to claim 9, wherein determining the cooling room number corresponding to the highest frequency according to the predetermined rule comprises:
- searching a preset frequency point matched with the highest frequency according to a preset cooling room demand table, and acquiring a cooling room number corresponding to the preset frequency point in the cooling room demand table, wherein correspondences between preset frequency points and cooling room numbers are recorded in the cooling room demand table.

11. The non-transitory computer storage medium according to claim 9, wherein the method further comprises: after determining the specific number of second computation resources and disabling the specific number of second computation resources,
- regularly acquiring a temperature of each computation resource; and
- when it is detected that the temperature of a certain computation resource is higher than a preset value, disabling the computation resource of which the temperature is higher than the preset value, and transferring a task required to be processed by the disabled computation resource to a computation resource with the lowest temperature of the computation resources which have been disabled according to the cooling room number, so as to be processed by the transferred computation resource.

12. The non-transitory computer storage medium according to claim 9, wherein the method further comprises: after determining the specific number of second computation resources and disabling the specific number of second computation resources,
- determining a highest frequency supported by each computation resource for operation, determining a minimum value from among the determined highest frequencies, determining a cooling room number corresponding to the minimum value according to the predetermined rule, and determining whether the determined cooling room number is smaller than the number of the computation resources which have been disabled;
- if the determined cooling room number is smaller than the number of the computation resources which have been disabled, further determining whether minimum current cost after a disabled computation resource is enabled is lower than present maximum current cost; and if the minimum current cost after a disabled computation resource is enabled is lower than present maximum current cost, enabling the disabled computation resource.

13. A computation resource control method, comprising:
- acquiring a highest frequency supported by a first computation resource for operation in a device;
- determining a cooling room number corresponding to the highest frequency according to a predetermined rule; and
- determining a specific number of second computation resources, and disabling the specific number of second computation resources, wherein the specific number is the same as the cooling room number;
- wherein the method further comprises: after determining the specific number of second computation resources and disabling the specific number of second computation resources,
- determining a highest frequency supported by each computation resource for operation, determining a minimum value from among the determined highest frequencies, determining a cooling room number corresponding to the minimum value according to the predetermined rule, and determining whether the determined cooling room number is smaller than the number of the computation resources which have been disabled;
- if the determined cooling room number is smaller than the number of the computation resources which have been disabled, further determining whether minimum current cost after a disabled computation resource is enabled is lower than present maximum current cost; and if the minimum current cost after a disabled computation resource is enabled is lower than present maximum current cost, enabling the disabled computation resource.

14. The method according to claim 13, wherein determining the cooling room number corresponding to the highest frequency according to the predetermined rule comprises:
searching a preset frequency point matched with the highest frequency according to a preset cooling room demand table, and acquiring a cooling room number corresponding to the preset frequency point in the cooling room demand table, wherein correspondences between preset frequency points and cooling room numbers are recorded in the cooling room demand table.

15. The method according to claim 13, wherein determining the specific number of second computation resources and disabling the specific number of second computation resources comprises:
determining idle computation resources, computation resources which are highly loaded and used for a long time and computation resources which are least busy from among a plurality of second computation resources, wherein the computation resources which are highly loaded and used for a long time refer to computation resources which are kept in a busy state within a certain period of time; and
disabling the computation resources according to one of the following manners:
selecting and disabling the specific number of idle computation resources,
disabling all the idle computation resources and a part of computation resources which are highly loaded and used for a long time, wherein a sum of a number of the idle computation resources and a number of disabled computation resources which are highly loaded and used for a long time is equal to the specific number, or
disabling all the idle computation resources, all the computation resources which are highly loaded and used for a long time and a part of computation resources which are least busy, wherein a sum of a number of the idle computation resources, a number of the computation resources which are highly loaded and used for a long time and a number of disabled computation resources which are least busy is equal to the specific number.

16. A computation resource control device, comprising:
a processor; and
a memory for storing instructions executable by the processor;
wherein the processor is arranged to:
acquire a highest frequency supported by a first computation resource for operation in a device;
determine a cooling room number corresponding to the highest frequency according to a predetermined rule; and
determine a specific number of second computation resources, and disable the specific number of second computation resources, wherein the specific number is the same as the cooling room number;
wherein the processor is further arranged to: after determining the specific number of second computation resources and disabling the specific number of second computation resources,
determine a highest frequency supported by each computation resource for operation, determine a minimum value from among the determined highest frequencies, determine a cooling room number corresponding to the minimum value according to the predetermined rule, and determine whether the determined cooling room number is smaller than the number of the computation resources which have been disabled at present;
if the determined cooling room number is smaller than the number of the computation resources which have been disabled, further determine whether minimum current cost after a disabled computation resource is enabled is lower than present maximum current cost; and
if the minimum current cost after the disabled computation resource is enabled is lower than the present maximum current cost, enable the disabled computation resource.

17. The device according to claim 16, wherein determining the cooling room number corresponding to the highest frequency according to the predetermined rule comprises:
searching a preset frequency point matched with the highest frequency according to a preset cooling room demand table, and acquiring a cooling room number corresponding to the preset frequency point in the cooling room demand table, wherein correspondences between preset frequency points and cooling room numbers are recorded in the cooling room demand table.

18. The device according to claim 16, wherein determining the specific number of second computation resources and disabling the specific number of second computation resources comprises:
determining idle computation resources, computation resources which are highly loaded and used for a long time and computation resources which are least busy from among a plurality of second computation resources, wherein the computation resources which are highly loaded and used for a long time refer to computation resources which are kept in a busy state within a certain period of time; and
disabling the computation resources according to one of the following manners:
selecting and disabling the specific number of idle computation resources,
disabling all the idle computation resources and a part of computation resources which are highly loaded and used for a long time, wherein a sum of a number of the idle computation resources and a number of disabled computation resources which are highly loaded and used for a long time is equal to the specific number, or
disabling all the idle computation resources, all the computation resources which are highly loaded and used for a long time and a part of computation resources which are least busy, wherein a sum of a number of the idle computation resources, a number of the computation resources which are highly loaded and used for a long time and a number of disabled computation resources which are least busy is equal to the specific number.

19. A non-transitory computer storage medium having stored thereon computer-executable instructions arranged to execute a computation resource control method, the method comprising:
acquiring a highest frequency supported by a first computation resource for operation in a device;
determining a cooling room number corresponding to the highest frequency according to a predetermined rule; and
determining a specific number of second computation resources, and disabling the specific number of second computation resources, wherein the specific number is the same as the cooling room number;

wherein the method further comprises: after determining the specific number of second computation resources and disabling the specific number of second computation resources, determining a highest frequency supported by each computation resource for operation, determining a minimum value from among the determined highest frequencies, determining a cooling room number corresponding to the minimum value according to the predetermined rule, and determining whether the determined cooling room number is smaller than the number of the computation resources which have been disabled;

if the determined cooling room number is smaller than the number of the computation resources which have been disabled, further determining whether minimum current cost after a disabled computation resource is enabled is lower than present maximum current cost; and if the minimum current cost after a disabled computation resource is enabled is lower than present maximum current cost, enabling the disabled computation resource.

20. The non-transitory computer storage medium according to claim 19, wherein determining the cooling room number corresponding to the highest frequency according to the predetermined rule comprises:

searching a preset frequency point matched with the highest frequency according to a preset cooling room demand table, and acquiring a cooling room number corresponding to the preset frequency point in the cooling room demand table, wherein correspondences between preset frequency points and cooling room numbers are recorded in the cooling room demand table.

* * * * *